United States Patent
Urriola

(10) Patent No.: US 7,686,540 B2
(45) Date of Patent: Mar. 30, 2010

(54) TRANSPORT CORRIDOR INFILTRATION SYSTEM

(75) Inventor: Humberto Urriola, Castle Cove (AU)

(73) Assignee: Astral Property Pty Ltd, Chatswood, NSW (AU)

(*) Notice: Subject to any disclaimer, the term of this patent is extended or adjusted under 35 U.S.C. 154(b) by 34 days.

(21) Appl. No.: 12/149,475

(22) Filed: May 2, 2008

(65) Prior Publication Data

US 2009/0148235 A1 Jun. 11, 2009

(30) Foreign Application Priority Data

Dec. 11, 2007 (AU) ............................... 2007906927

(51) Int. Cl.
*E01F 5/00* (2006.01)
(52) U.S. Cl. .............................. 405/43; 405/53; 405/45; 404/4
(58) Field of Classification Search .................. 405/36, 405/43, 44, 45, 46, 50, 52, 53; 404/2, 4; 210/163, 164
See application file for complete search history.

(56) References Cited

U.S. PATENT DOCUMENTS

| | | | |
|---|---|---|---|
| 3,608,443 A * | 9/1971 | Gagle et al. ................... 404/4 |
| 3,837,168 A * | 9/1974 | Alsberg et al. ................ 405/50 |
| 4,366,846 A * | 1/1983 | Curati, Jr. .................... 405/53 |
| 5,130,016 A * | 7/1992 | Gavin ........................... 404/4 |
| 5,529,436 A * | 6/1996 | Meyers ........................... 404/4 |
| 5,803,662 A * | 9/1998 | Gunter ........................... 404/4 |
| 5,810,510 A * | 9/1998 | Urriola ......................... 405/45 |
| 6,234,711 B1 * | 5/2001 | Beaman ......................... 404/4 |
| 6,467,994 B1 * | 10/2002 | Ankeny et al. ................ 405/45 |
| 6,585,449 B2 * | 7/2003 | Chen ............................ 405/43 |
| 6,841,077 B2 * | 1/2005 | Gannon et al. ................. 404/4 |
| 6,962,463 B2 * | 11/2005 | Chen ............................ 404/75 |
| 6,962,464 B1 * | 11/2005 | Chen ............................ 405/43 |
| 7,029,201 B1 * | 4/2006 | McCormick et al. .......... 405/50 |
| 7,105,086 B2 * | 9/2006 | Saliba ......................... 210/163 |
| 2006/0210358 A1 * | 9/2006 | Chen ............................ 404/2 |
| 2008/0308476 A1 * | 12/2008 | Silverstein et al. .......... 210/163 |
| 2009/0049768 A1 * | 2/2009 | Kim .............................. 404/4 |

* cited by examiner

*Primary Examiner*—Frederick L Lagman

(57) ABSTRACT

A roadway or other transport corridor infiltration system which collects runoff while allowing for the easily removal of litter from its surface. The infiltration system comprises at least the edge surface of the roadway or other transport corridor being formed by a plastics grid structure having at least its upper surface formed by an array of alternate openings and support members, such that water can permeate therethrough. An infiltration layer is located at least below and in communication with said grid structure, filled with aggregate material, which is larger in cross-section than the width of the openings of said grid structure. A geotextile wrapped water permeable infiltration tank located below and in communication with said infiltration layer, such that runoff passes through the grid structure into the infiltration layer and into the permeable infiltration tank, where the water is stored and/or flows back into the soil through the walls of the tank and the geotextile.

3 Claims, 6 Drawing Sheets

TRANSPORT CORRIDOR INFILTRATION SYSTEM

BACKGROUND OF THE INVENTION

The present invention relates to an improved infiltration system for traffic areas such as roadways, train corridors, runways and carparks.

Presently the roadways are based upon the old Roman system of having a water impervious top layer that directs water into side gutters where it passes into underground pipes and drains, which are impervious to water, and is directed from a large catchment area into creeks, rivers and the ocean.

Thus when it rains, all of the rubbish and pollution such as oil, grease, vegetation, dog faeces, food stuffs, paper, dissolved pollutants and detergents, are flushed into the drainage system and concentrated into the outfall area, such as a creek, river and the ocean. There is little or no attempt in most of the existing drainage systems to decontaminate this storm water pollution. If any treatment is carried out, it, usually, only involves a filtering out of larger solids. This dumping of the stormwater runoff into the water ways, degrades the water ways by depleting the oxygen from the waterways, and introduces chemicals which increases, in some cases exponentially, the growth algae, both of which destroys the healthy fauna and flora of the waterways.

Further because the natural water absorbing soils and vegetation have been covered or removed and replaced by water impermeable roads, there is an increase in the amount of runoff in urban areas, than if the area was in its natural state.

Attempts have been made to ameliorate these problems by using permeable drains having a surface of permeable tar or the like. However these do not have a permeability to cope with heavy rain.

Further attempts were made using heavy duty drainage cell filled with gravel or grass as the road or pavement surface. Whilst these provide an improved infiltration, they are difficult to clean by removing litter and rubbish that collects on the surface of the heavy duty drainage cell, without disturbing the gravel or the grass, and decaying litter and rubbish produces anaerobic conditions within the soil and gravel resulting in the growth of anaerobic bacteria, which decreases the permeability of the soil or gravel. Further the drainage cells are not wheel chair friendly and provided difficult surfaces for women with high heel shoes to navigate.

SUMMARY OF THE INVENTION

The present invention seeks to ameliorate these problems by providing a roadway or other transport corridor infiltration system comprising:

at least the edge surface of the roadway or other transport corridor being formed by a plastics grid structure having at least one surface formed by an array of alternate openings and support members, such that water can permeate therethrough;

an infiltration layer, located at least below and in communication with said grid structure, filled with aggregate material, which is larger in cross-section than the width of said openings; and a geotextile wrapped water permeable infiltration tank located below and in communication with said infiltration layer, such that runoff passes through the grid structure into the infiltration layer and into the permeable infiltration tank, where the water is stored and/or flows back into the soil through the walls of the tank and the geotextile.

In another form the invention the invention comprises a roadway or other transport corridor infiltration system comprising:

at least the edge surface of the roadway or other transport corridor being formed by a plastics grid structure having at least one surface formed by at least one array of alternate parallel elongated openings and support members, such that water can permeate therethrough;

an infiltration layer, located at least below and in communication with said grid structure, filled with aggregate material, which is larger in cross-section than the width of said openings; and a geotextile wrapped water permeable infiltration tank located below and in communication with said infiltration layer, such that runoff passes through the grid structure into the infiltration layer and into the permeable infiltration tank, where the water is stored and/or flows back into the soil through the walls of the tank and the geotextile.

In an embodiment of the invention the grid structure has at least one surface formed by arrays of alternate parallel elongated openings and support members, with adjacent arrays being opposed in orientation to surrounding arrays.

In another embodiment the grid structure has peripheral walls which extend downwardly below the surface of the grid structure to form a skirt.

In a further embodiment, the grid structure has web members located beneath the support members.

BRIEF DESCRIPTION OF THE DRAWINGS

The invention will now he described by way of example with reference to the accompanying drawings, in which.

DETAILED DESCRIPTION OF THE PREFERRED EMBODIMENTS

Figure 1:
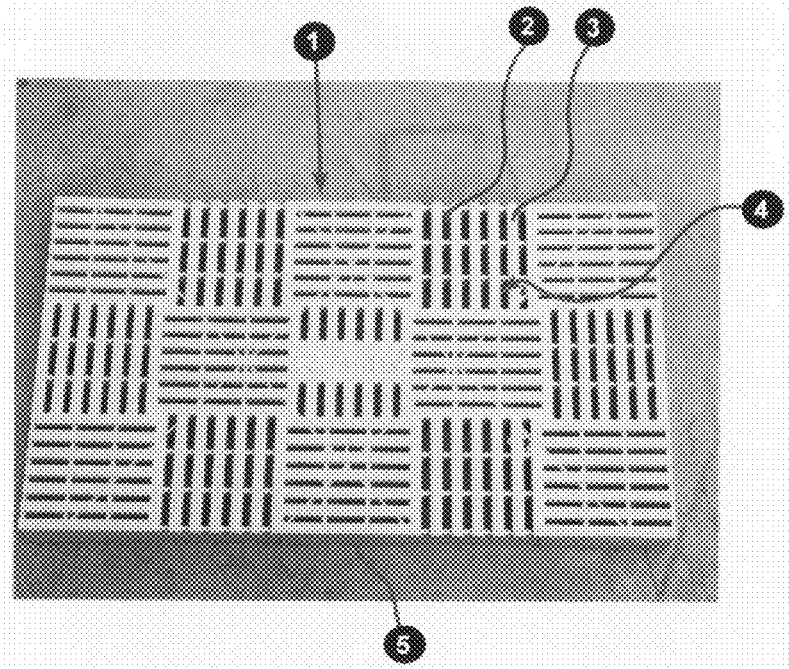
FIG. 1 is an upper view of a grid structure suitable for use in an embodiment of the present invention.
Figure 2:
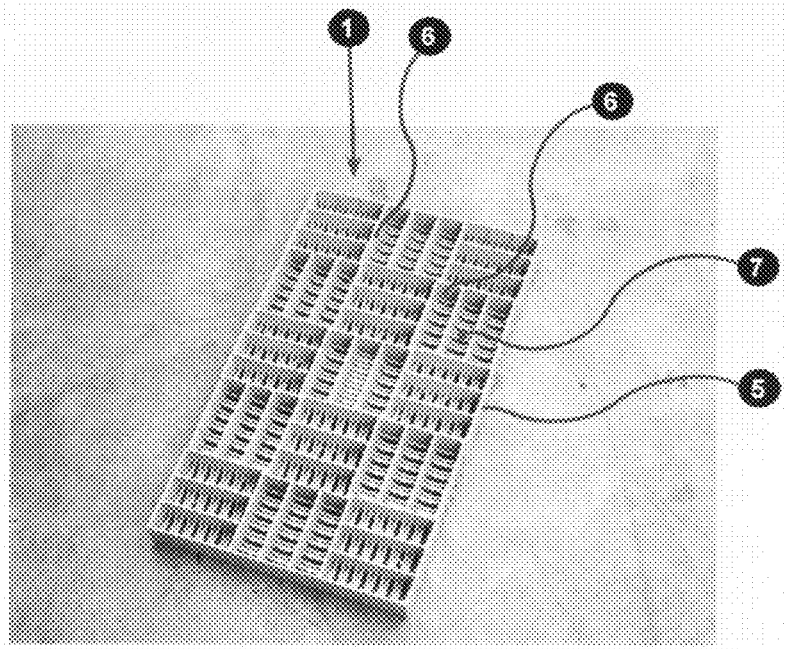
FIG. 2 is a lower view of the grid structure of FIG. 1.

The grid structure could have the alternating openings and support members of any suitable shapes. However a first embodiment of a grid structure (1) suitable for use with the present invention, as shown in FIGS. 1 & 2, comprises basically an array (4) of alternate parallel elongated openings (2) and support members (3), which form a filter to allow water to pass therethrough while filtering out solids over a predetermined dimension. However preferably as shown the FIGS. 1 & 2, the grid structure (1) has a plurality of arrays (4) which are orientated normal to adjacent arrays (4), such that the elongated openings (2) and support members (3) of one array (4) runs 90° to those of adjacent arrays (4). The elongated opening (2), preferably, has a width less than 10 mm and the support members preferably have a width of approximately 10 mm.

The grid structure (1) has a peripheral skirt (5) extending below the arrays (4) with web members (6) running transversely across the base of the support members (3) in each array (4). To provide additional structural support each support member (3) has on its base strengthening ribs (7) running between adjacent web members (6).

The grid structure can be made of any suitable material such a plastics or metal.

The present invention relates to an improved infiltration system for traffic areas such as roadways, train corridors and runways.

Figure 3:
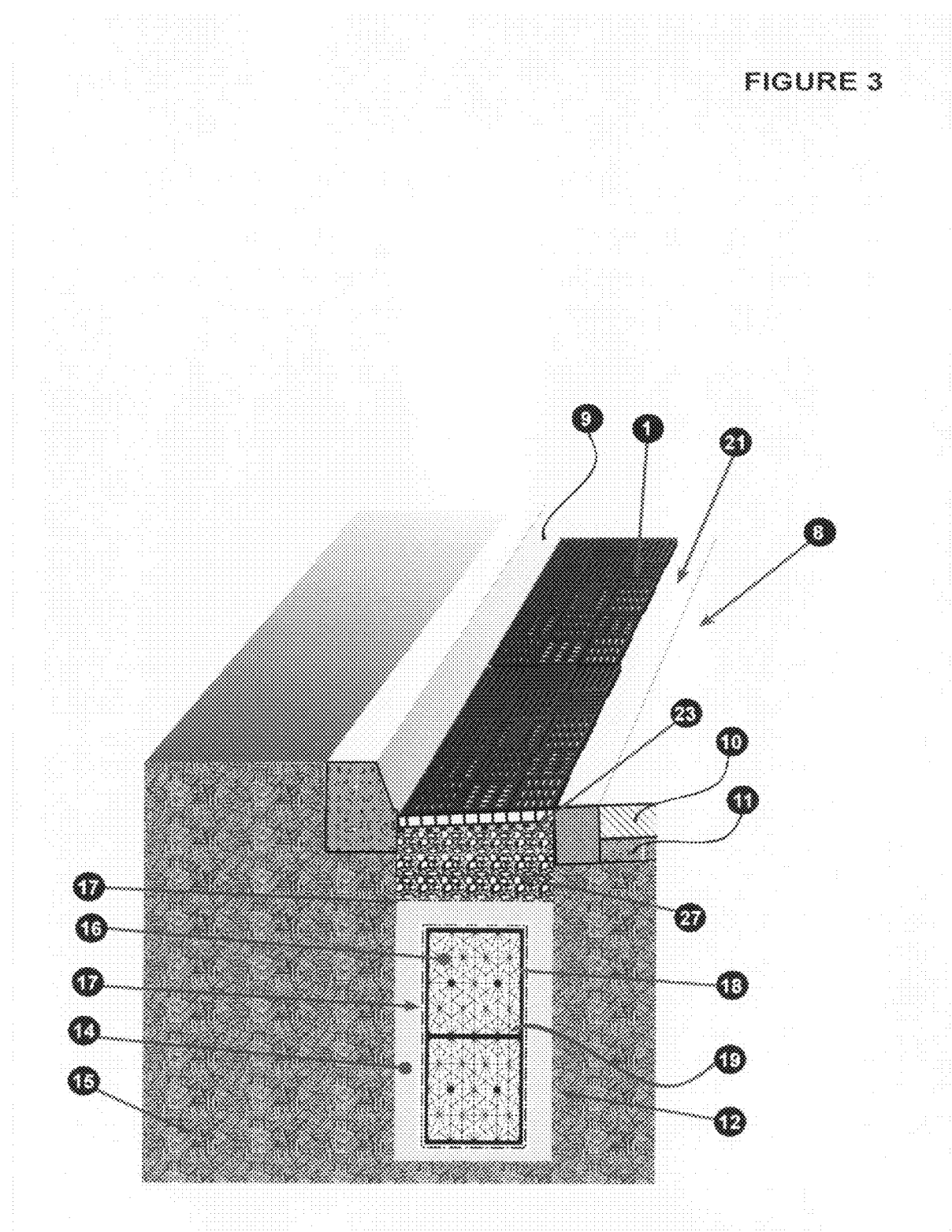
FIG. 3 is a schematic sectional view of a system using a grid structure to form a permeable infiltration edge for an existing road according to one embodiment of the present invention.

An existing prior art roadway drainage system incorporates a water impervious road surface that is sloped to direct water into a gutter, where the water is directed along to flow into an underground water impervious drainage system where the water is discharged into a creek, river or the ocean. As shown in FIG. 3, one embodiment of the present invention involves the modification of the existing road (8) and gutter (9).

In this embodiment the lower gutter (9), road surface (10), and underlying sub-base (11), adjacent the gutter, are removed by any suitable means and is replaced by an infiltration area. A trench (12) is dug and a water impervious liner (13) should be positioned against the roadway side of the trench (12) if the soil (15) is clayey. Sand (14) is placed at the bottom of the trench (12). Infiltration tank modules (16) are placed, on a geotextile sheet (17), end to end along the trench, and also stacked one on top of the other to the required height, and wrapped in the geotextile sheet (17).

Generally these infiltration tank modules (16) are hollow with perforated walls (18) made from plastics, and are load bearing. The modules could be constructed as shown in Australian patent no. 785313, wherein the modules (16) have walls (18) composed of a lattice of thin web members (19).

Suitable aggregate material such as gravel or sand (14) surrounds the thus wrapped drainage modules (16), and a layer of geotextile (17), is laid on top of the sand (14). A suitable concrete edge (21) is placed against the cut existing road (8) and a layer of granular medium such as remediating soil (22) is placed on top of the geotextile (17), with a shade cloth layer (23) on top of that. A grid structure (1) is then placed on the shade cloth (23)

Therefore during rain, water runs off the impervious road surface (10) and onto the grid structure (1) of the infiltration area, where the water passes through the grid structure (1), and into the remediating soil (22), which can be a mixture of gravel and remediating soil, where some pollutants are absorbed and broken down by bacteria, while the majority of gross pollutants are captured on the grid structure (1). The water then infiltrates through the sand (14) and can pass into the surrounding soil (15), or flow into the water permeable channels formed by the drainage modules (16), where the water can be temporarily stored for percolation back into the surrounding soil (15), an/or can flow along the water permeable channels to a storage area for percolation back into the soil or for supplying water for sprinkler systems or the like.

Figure 4:
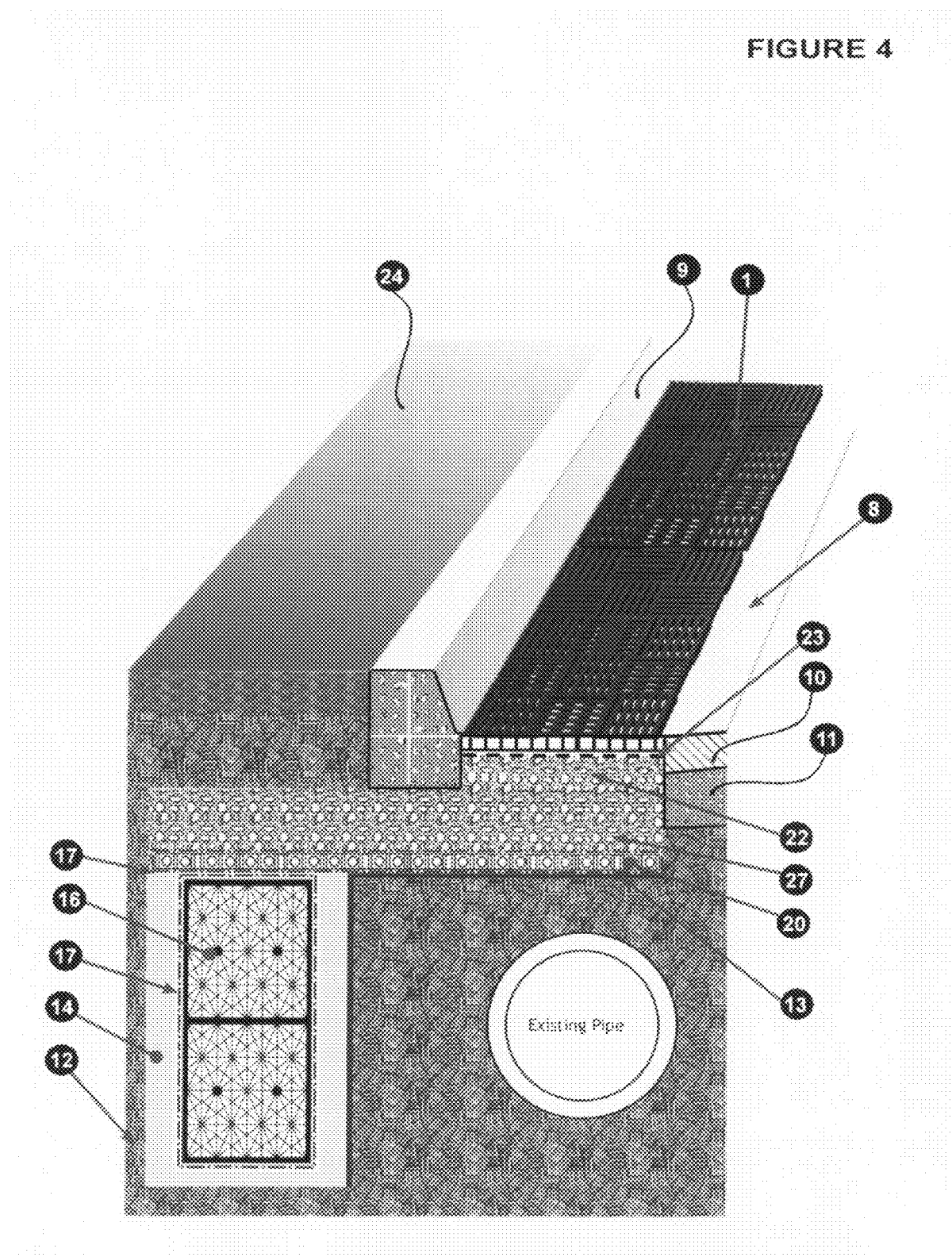
FIG. 4 is a schematic sectional view of a system using a grid structure to form a permeable infiltration edge of an existing road according to a second embodiment of the present invention.

A further embodiment is shown in FIG. 4, in which the gutter (9) and the water impermeable road surface (10) of an existing road (8), is cut and removed in a similar manner to that described with reference to FIG. 3, except that in this case, the channel formed by the drainage modules (16) is placed under the pedestrian way (24). A drainage cell (20), wrapped in water permeable geotextile (17), is placed on the bottom of the trench (25) and extends onto the top of the infiltration tank modules (16). An aggregate material (27) covers the drainage cell (20) with a layer of remediating soil (22) covering the aggregate material (27). A layer of shade cloth (23) covers the remediating layer (22) In this case the existing pipes (26) can be left in situ.

Hence, water percolating the grid structure (1) flows through the layers (22 & 27) and into the drainage cell (20) where it flows along to egress into the geotextile wrapped infiltration tank modules (16). The distribution of the water back into the environment is the same as that of the previous embodiment.

Figure 5:
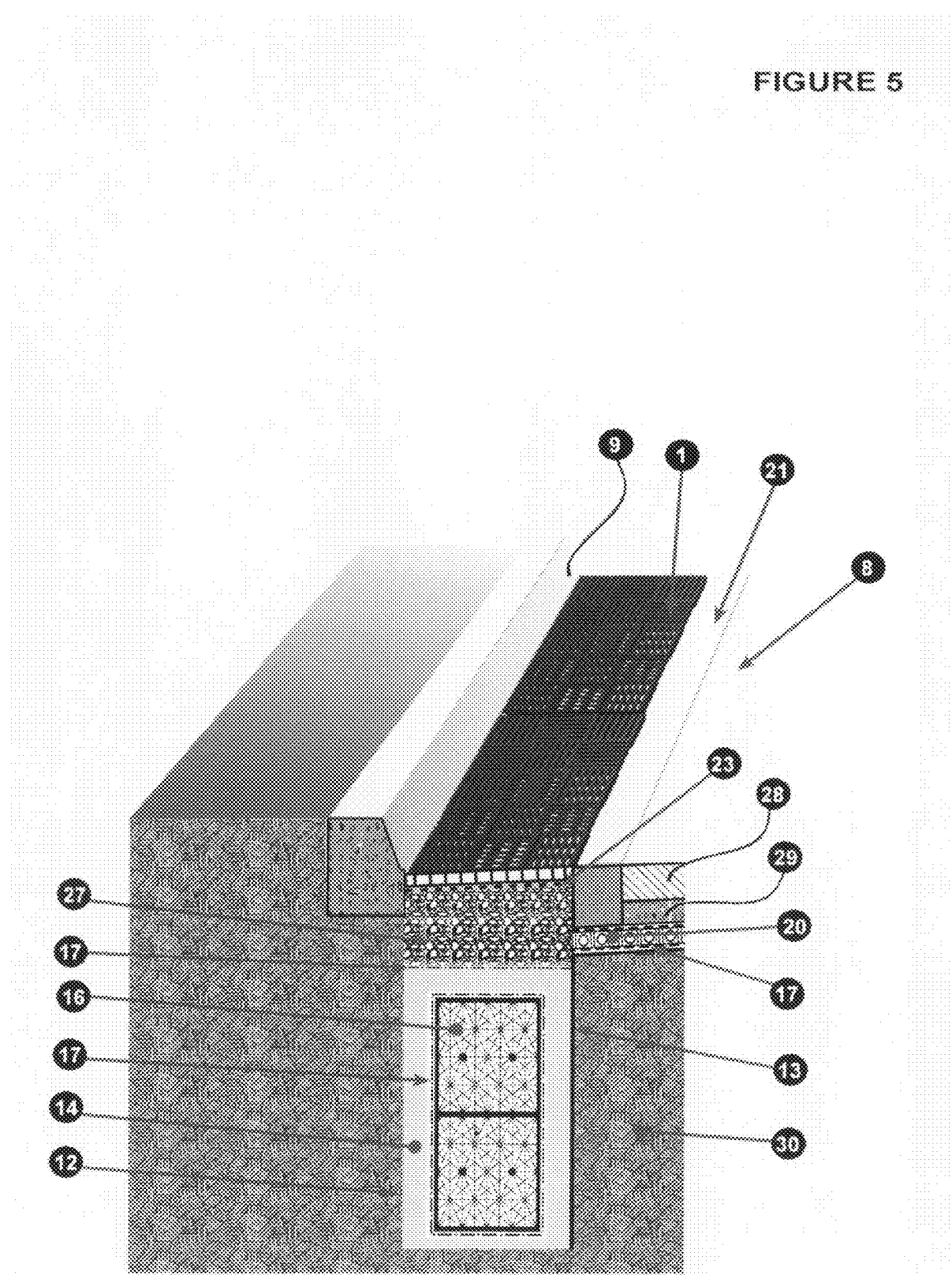
FIG. 5 is a schematic sectional view of a system using a grid structure to form a permeable infiltration edge of a new road according to yet another embodiment of the present invention.

In the case of a new road the construction, as shown in FIG. 5, can be used, with the road being replaced with water permeable bitumen (28) and a water permeable road base (29) with a layer of drainage cells (20) wrapped in geotextile (17) positioned between the ground strata (30) and the road base (29), to provide an infiltration flow layer which extends either into the infiltration layer (27) or as shown in FIG. 4, above the infiltration tank modules (16), so that water that infiltrates through the water permeable bitumen (28) and a water permeable road base (29) flows along the drainage cell (20) into the infiltration tank modules (16). The tank modules (16) could be located under the footpath as shown in FIG. 4 or under the curb as shown in FIG. (5).

Figure 6:
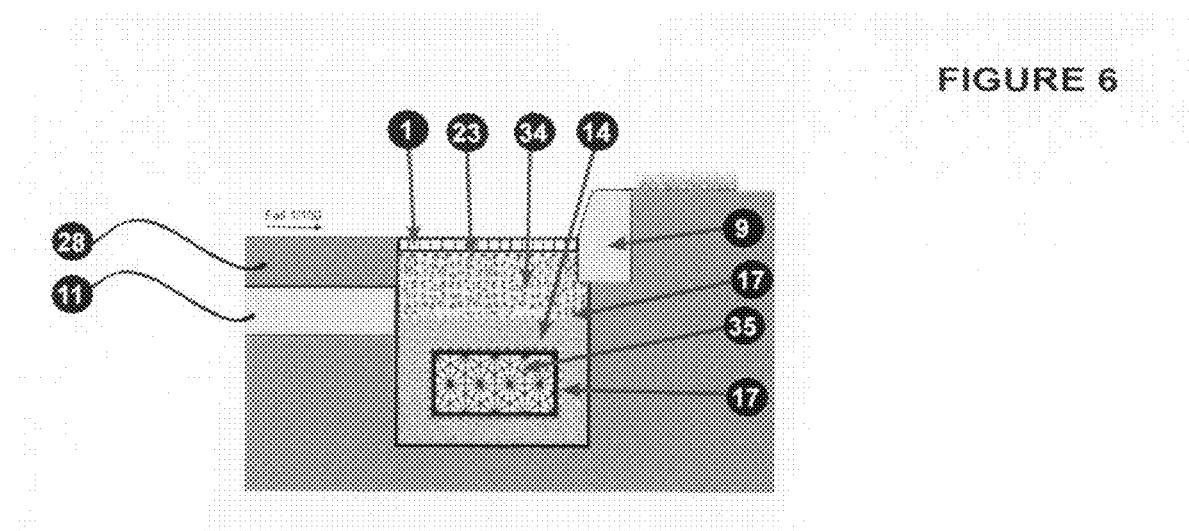
FIG. 6 is a schematic sectional view of a system using a grid structure to form a permeable infiltration edge of a road according to yet another embodiment of the present invention.
Figure 7:
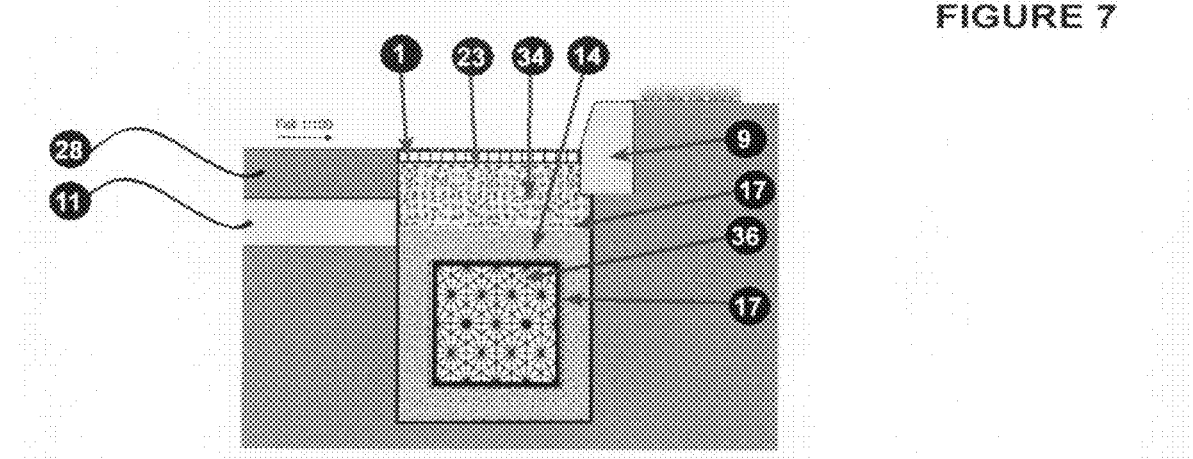
FIG. 7 is a schematic sectional view of a system using a grid structure to form a permeable infiltration edge of a road according to yet another embodiment of the present invention.
Figure 8:
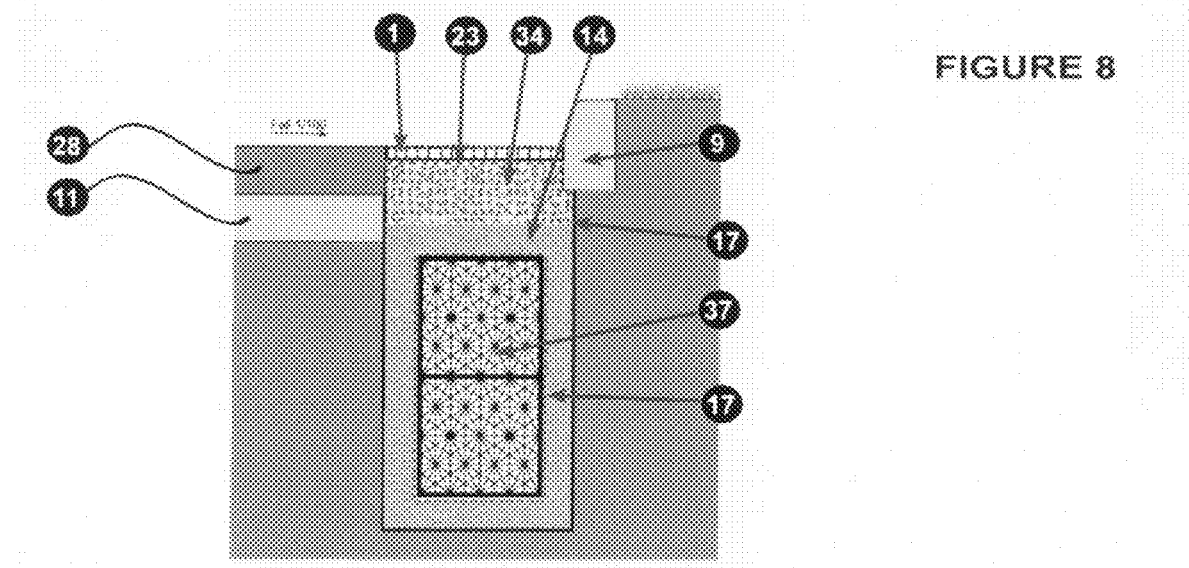
FIG. 8 is a schematic sectional view of a system using a grid structure to form a permeable infiltration edge of a road according to yet another embodiment of the present invention.

FIGS. 6-8 show a similar arrangement to that shown in FIG. 3, showing different sizes of tank modules; a small module (36) in FIG. 6, a single tank module (36) in FIG. 7 and a double tank module in FIG. 8.

Figure 9:
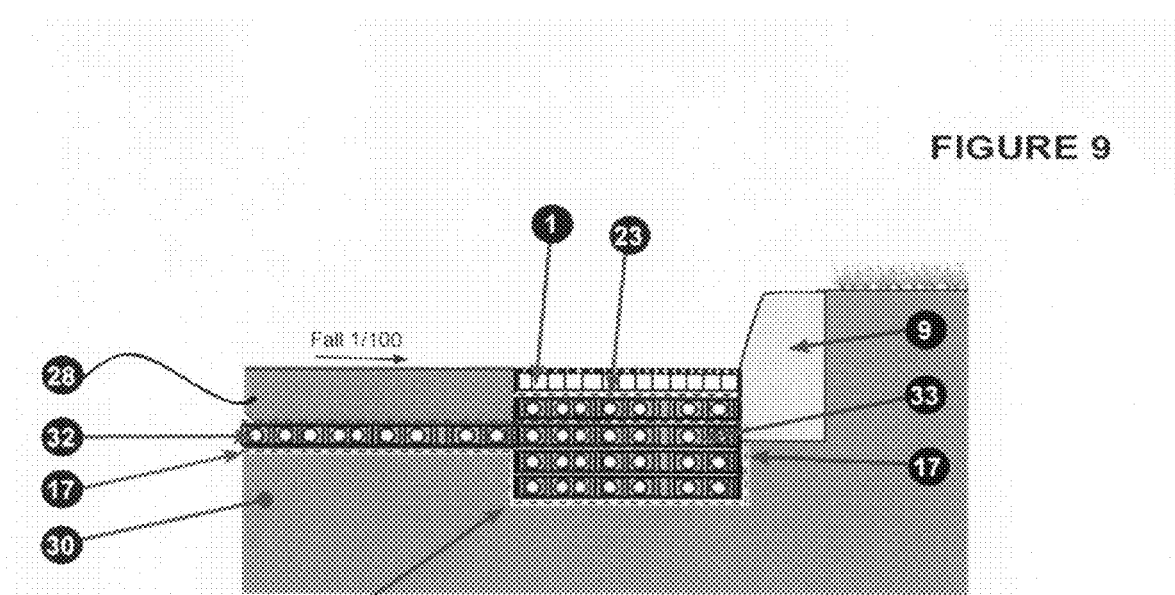
FIG. 9 is a schematic sectional view of a system using a grid structure to form a permeable infiltration edge of a road according to yet another embodiment of the present invention.

FIG. 9 shows a different embodiment of the present invention for use in the construction of a new road. The ground (30) is leveled off and compacted to 95%. A trench (31) is dug and the base compacted. A layer of geotextile (17) is placed in the trench (31) and over the compacted surface of the ground (30). Heavy duty drainage cells (32) are placed over the geotextile (17) on the ground (30). Additional heavy duty drainage cells (33) are stacked along the trench (31) to the height of the heavy duty drainage cells (32) on the ground (30) and interlocked with them, and the heavy duty drainage cells (32 & 33) are then wrapped in geotextile (30).

A road surface using water permeable bitumen (28) is formed over the geotextile wrapped drainage cells (32), and additional heavy duty drainage cells (33) are placed the trench (31) and a layer of shadecloth mesh (23) is placed over the upper most heavy duty drainage cells (33), and a grid structure (1) layer is placed thereon to be flush with or slightly lower than the road surface, which has a 1 in 100 fall to the infiltration system.

Figure 10:
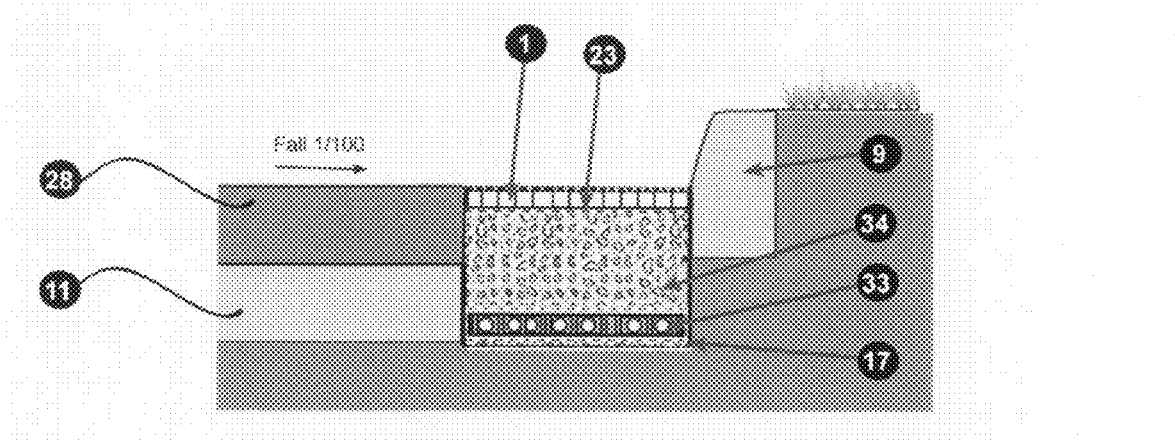
FIG. 10 is a schematic sectional view of a system using a grid structure to form a permeable infiltration edge of a road according to yet another embodiment of the present invention.
Figure 11:
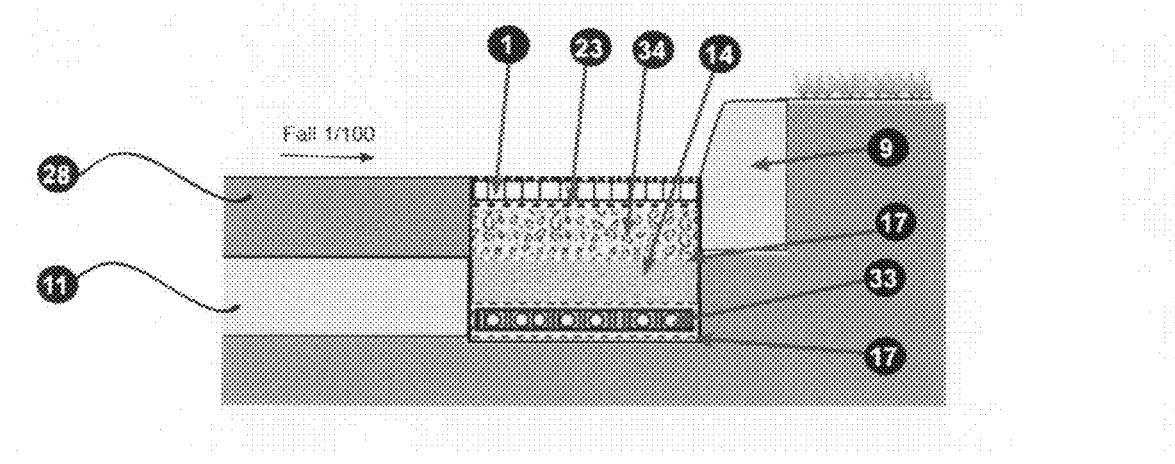
FIG. 11 is a schematic sectional view of a system using a grid structure to form a permeable infiltration edge of a road according to yet another embodiment of the present invention.

FIGS. 10 & 11 show a retrofit arrangement similar to that shown in FIG. 3, wherein the gutter (9) is cut away and a trench (12) is dug and instead of using a geotextile wrapped infiltration tank, a geotextile wrapped drainage cell (33) forms the infiltration flow layer.

In one embodiment as shown in FIG. 10 compacted gravel (34) forms the infiltration medium, with a layer of shadecloth mesh (23) between the grid structure (1) and the compacted gravel (34). While as shown in FIG. 11, the drainage cells (33) are surrounded by washed river sand (14), with a layer of geotextile (17) and an upper layer of compacted gravel (34) with a layer of shadecloth mesh (23) between the grid structure (1) and the compacted gravel (34).

Thus the present invention provides an infiltration gutter system which has high infiltration and ease of cleaning when compared to existing systems.

It should be obvious that modifications and alterations can be made to the above description without departing from the scope and the spirit of the present invention.

What is claimed is:

1. A roadway or other transport corridor infiltration system comprising:

at least the edge surface of the roadway or other transport corridor being formed by a grid structure formed by a plurality of plastics grid modules, each having one surface formed by a plurality of arrays of alternate parallel elongated openings and support members with each array being orientated 90° to adjacent arrays, a peripheral wall which extend downwardly below the arrays to form a skirt, and having transverse web members located beneath the support members running normal to the support members and connecting with the adjacent transverse web member of adjacent arrays, such that water can permeate therethrough;

an infiltration layer, located at least below and in communication with said grid structure, filled with aggregate material, which is larger in cross-section than the width of the elongated openings of the grid structure, whereby the peripheral skirt of the grid rests on the infiltration layer forming an air gap between the infiltration layer and the arrays of the elongated support members and elongated openings; and a water permeable plastics infiltration tank located below and in communication with said infiltration layer, such that runoff passes through the grid structure into the infiltration layer and into the permeable infiltration tank, where the water is stored and/or flows back into the soil through the walls of the tank.

2. A roadway or other transport corridor infiltration system according to claim 1, wherein the transverse web members extend downwardly from the arrays the same distance as the peripheral skirt.

3. A roadway or other transport corridor infiltration system according to claim 2, wherein the support members have additional web members which extend longitudinally on the support members and connects to adjacent transverse web members and extend below the arrays less distance than the peripheral skirt and the transverse web members.

* * * * *